United States Patent [19]
> Warshawsky et al.

[11] Patent Number: 4,568,700

[45] Date of Patent: Feb. 4, 1986

[54] PROCESS FOR THE PRODUCTION OF HALOMETHYLATING AGENTS WHICH ARE OF LOW VOLATILITY

[75] Inventors: Abraham Warshawsky; Abraham Deshe, both of Rehovot, Israel

[73] Assignee: Yeda Research and Development Co. Ltd., Rehovot, Israel

[21] Appl. No.: 525,619

[22] Filed: Aug. 22, 1983

[51] Int. Cl.$^4$ ................................................ C08F 8/24
[52] U.S. Cl. ............................... 521/31; 525/332.9; 525/333.3; 525/359.3; 570/144; 570/145; 570/185; 570/195
[58] Field of Search .................... 525/359.3, 332.9; 570/195, 144, 145, 185; 521/31

[56] References Cited

U.S. PATENT DOCUMENTS

| | | | |
|---|---|---|---|
| 2,973,391 | 2/1961 | Earhart et al. | 570/195 |
| 3,168,580 | 2/1965 | Adams | 570/185 |
| 3,230,267 | 1/1966 | Fields | 570/185 |
| 3,271,465 | 9/1966 | Krewer et al. | 570/195 |
| 3,995,094 | 11/1976 | Crosby et al. | 525/359.3 |

OTHER PUBLICATIONS

L. D. Taylor et al., "On the Carcinogenicity of Bis(-Chloromethyl) Ether and Chloromethyl Methyl Ether", *J. of Phys. Chem.*, vol. 78, No. 26, (1974).
K. Negoro et al., Nippon Kagako Kaishi, 8 1181 (1977).
Szymanowski, J. et al., "Products of Tetradecoxymethyl Chlorine Reaction with Sucrose", *Roczniki Chemii Ann. Soc. Chim. Polonorum*, 50, 215 (1976).
Staniewski, J., "Gas Chromatographic Determination of Some Methyl-D-Glucopyranoside Pentyloxymethyl Ethers", *J. of Chromatography*, 240, 522-525 (1980).
Szymanowski, J. et al., "Alcoxymethyl Ethers of Glucose and its Oligomers", *Die Starke*, No. 8, 277-281 (1977).
Biniakiewicz, D. et al., "Alcoxymethyl Ethers of Glucose and its Oligomers", *Die Starke*, No. 10, 353-358 (1977).

Olah, G. A. et al., "Carcinogen Chemistry", *J. Org. Chem.*, 46, 571-577 (1981).
Olah, G. A. et al., "Haloalkylations" in *Friedel-Crafts and Related Reactions*, vol. II, J. Wiley & Sons, New York, N.Y., 1964, pp. 659-671, 734-737.
Tou, J. C. et al., "Possible Formation of Bis(Chloromethyl)Ether from the Reactions of Formaldehyde and Chloride Ion", Analytical Chemistry, vol. 48, No. 7, Jun. 1976, pp. 958-963.
Olah, G. A. et al., "Synthetic Methods and Reactions. X 1-Chloro-4-Chloro(Bromo)Methoxybutane and 1,4-Bis-[Chloro(Bromo) Methoxy]Butane: New Convenient Halomethylating Agents," *Synthesis*, 560-561 (1974).
Olah, G. A. et al., "Aromatic Substitution. XXXVIII. Chloromethylation of Benzene and Alkylbenzenes with Bis(Chloromethyl)Ether, 1,4-Bis(Chloromethoxy)Butane, 1-Chloro-4-Chloromethoxybutane, and Formaldehyde Derivatives", *J. Org. Chem.*, vol. 41, No. 9, 1976, pp. 1637-1641.
Schwachula, G. et al., "Investigation of the Formation of Strongly Acid Cation Exchange Resins Based on Slightly Cross-Linked Copolymers", *J. Polymer Sci.: Symposium No. 47*, 103-109, (1974).
Amato, J. S. et al., "A New Preparation of Chloromethyl Methyl Ether Free of Bis[Chloromethyl]Ether", *Synthesis*, 970-971 (1979).
Jung, M. E. et al., "A New Efficient Synthesis of Iodomethyl Methyl Ether", *Synthesis*, 588-589 (1978).
Mason, C. T. et al., "A Study of the Friedel-Crafts Synthesis with Alkoxychloroalkanes", *J. Am. Chem. Soc.* 73, 4644-4647 (1951).

*Primary Examiner*—Joseph L. Schofer
*Assistant Examiner*—Bernard Lipman
*Attorney, Agent, or Firm*—Browdy and Neimark

[57] ABSTRACT

There is provided a process for the production of halomethylating agents which are of low volatility; and a process for the halomethylation of aromatic substrates and aromatic polymeric substances. Among products produced from the halomethylaryl polymers there are anion exchange resins.

11 Claims, No Drawings

PROCESS FOR THE PRODUCTION OF HALOMETHYLATING AGENTS WHICH ARE OF LOW VOLATILITY

BACKGROUND OF THE INVENTION

Chloromethylation of aromatic substrates and polymers is carried out readily using chloromethylether (CME) or bis-chloromethyl ether (BCME) (G. A. Olah, Friedel-Crafts and related reaction, Vol.II, Part 2, p. 659, J. Wiley & Sons, N.Y. 1964). Since both reagents have been listed as highly carcinogenic, the alternative use of formaldehyde or paraformaldehyde in acidic aqueous solutions has been tried [R. Hauptmann and G. Schwachula, Z. Chem., 8, 227-8 (1968)]. This method was found ineffective in the case of hydrophobic polymeric materials and also unsafe, since BCME is formed under those condtions, and acts as the active chloromethylating intermediate. The same holds true for other methods using formaldehyde derivatives, as the methylalchlorosulfonic acid method.

The major hazard in the use of CME and BCME lies in their high volatility which causes lung cancer: S. Laskin, M. Kuschner, R. T. Drew, V. P. Cappiello and N. Nelson Arch Enviromen. Health, Vol 23, 135 (1971) and L. D. Taylor and N. s. Simon, J. of Physical Chemistry, Vol. 78, 2696 (1974). There exists clear evidence that reactions of formaldehyde and chloride ions lead to BCME. [J. C. Tou and G. T. Kallos, J. Analytical Chemistry, Vol. 48, 958 (1976)] and that formaldehyde causes induction of nasal cancer in the rat [R. T. Albert, A. R. Sellakumar, S. Laskin, M. Kuschner, N. Nelson and C. A. Snyder, JNCl, Vol 68, 589 (1982)]. Because of the high volatility of CME and BCME, OSHA has issued stringent air control regulations [Occupational Safety and Health Standards Part III, Department of Labor, Occupational Safety and Health Administration, Fed Regist 39 (Tuesday, Jan 29), 3576-3797 (1971)]of those carcinogens.

We have now discovered, that *long* chain alkyl-halomethyl ethers are very effective and safe halomethylating agents, since they offer the following advantages:

1. The reagents are readily prepared in quantitative yields, and easily stored.
2. The reagents are powerful halomethylating agents and stable to various reaction conditions.
3. The reagents have low volatility. Increasing the size of the R group or selecting R as a small polymer residue, e.g., a polyvinyl-alchol group, yields reagents of extremely low volatility.
4. The alcohol can be recovered after the chloromethylation and reused.
5. Control over the reaction parameters avoids formation of side products such as CME or BCME.
6. The hydrophobic alcohols do not deactivate the Friedel-Crafts catalyst and may be applied in considerable excess.

In comparison, the compounds suggested by Olah et al. [(G. A. Olah, D. A. Beal, S. H. Yu and J. Olah, Synthesis 560-561 (1974)][G. A. Olah, D. A. Beal, and J. A. Olah, J. Org. Chem., 41 1627-1631 (1976)] possess high volatilities; after "torr)," and boiling points range between 70°-94° C. at 5 torr), incorporate bis-halomethyl groups which are an order of magnitude more hazardous than the mono-halomethyl compounds. Furthermore, compounds of type 1 are not economical, since only one of the $CH_2X$ groups is used, the other group being lost as $CH_2O$ moiety.

In addition, reagents with the bis-halomethyl group are much more hazardous than the corresponding mono-halomethyl compounds as indicated by Van Duuren, Goldschmidt and Seidman [Cancer Research Vol 35, 2553 91975)] for bis-1.4-chloromethoxybutane and related compounds. In addition, the side product, tetrahydrofuran cannot be converted to 1 and reused.

The purpose of this invention is to provide halomethylating agents of improved safety, where emphasis is on improved safety in the preparation of the reagents, and in their use in halomethylation reactions, For that purpose careful attention is given not only to the identity of the reagent but to its preparation, with suitable control of reaction conditions and reactant ratio to avoid presence of any free $CH_2O$ which would lead to BCME. In addition to synthetic procedures we disclose also levels of BCME as found in combined gas chromatographic mass spectral analysis and consequently specify methods and conditions for safe preparation and handling of halomethylating reagents. The long-chain alkyl-halomethylethers are prepared by reacting a suitable alcohol with formaldehyde or paraformaldehyde in an organic solvent to give the desired product. The reaction can be carried out at ambient temperature and pressure and gives a high yield and a product of high purity. When the product is used as halomethylating agent, the alcohol is set free and can be used for the preparation of further batches of halomethylating agents.

Tin-tetrachloride and titanium tetrachloride were used as the Friedel-Crafts Lewis acid catalysts. However, other catalysts known to be effective in chloromethylation (G. A. Olah, Friedel-Crafts and related reactions, Vol. II, Part 2, p. 659, J. Wiley & Sons, N.Y. 1964) can be used, depending on the specific activity required, the need to avoid further cross-linking reaction, or pertinent price considerations. The reactivity of the halomethylating agents was established by reactions with simple aromatic substrates, such as benzene and alkylbenzene derivatives, and also on styrene-divinylbenzene copolymers. The alkylchloromethylether compounds can be reacted with various styrene-divinylbenzene copolymers in common swelling solvents applied in chloromethylation, e.g. halogenated paraffins, or in other solvents such as alkanes. Common Lewis-acid catalysts, such as stannic chloride, zinc chloride, or aluminium chloride are used. The most preferred conditions are chloromethylation in $CH_2Cl_2$ or $CHCl_3$ at room temperature. The ratio of alkylchloromethyl ether-to-polymer-to-$SnCl_4$ varies according to the reactivity of the polymer, which is determined by the swelling properties of the polymer. After the reaction, the polymer is filtered off, washed with chloroform, then with methanol and reacted with an amine to yield an anion exchange resin. The solution is washed with aqueous HCl solution to remove the catalyst, then with water, and the ROH product is recovered directly or after purification by distillation or dialysis. As an alternative route, "one pot preparation" of anion exchange resins from the non-functionalized copolymers is possible. The halomethylating agent is first prepared, and the copolymer and Lewis acid catalyst is then added, followed, after halomethylation by the amine. The final product, an anion exchange resin, is obtained, and any excess of the halomethylalkylether is destroyed, but the starting alkanol is regenerated. Thus, the workup of the "one pot reaction" does not involve handling of any alkylating agent.

The selection of $ROCH_2X$ reagent is governed by the first five considerations outlined earlier. In addition ROH should be inexpensive and commercially available. Thus alkanols with R, being shorter than a four carbon chain or longer than twenty carbon chains, are excluded. Alkanols in the ranges of 6–12 carbon atoms are practically possible but the need to avoid the presence of even a small amount of CME or BCME (criterion 5, above), dictates that not only the properties of the final reagents, but also how they effect the presence of undesired BCME must be considered. In other words, the relative rates of formation of $ROCH_2Cl$ against the rate of formation of $ClCH_2OCH_2Cl$ must be one of the major criteria of selecting the best $ROCH_2Cl$ reagent. The following examples illustrate the synthesis of long chain halomethylalkyl ether from various classes of alcohols: primary, secondary, benzylic, tertiary, phenolic, and polyols.

GENERAL PROCEDURE 0.1 mole of the alcohol and 0.1 mole of paraformaldehyde, and 10 gr of a drying agent ($CaCl_2$) were suspended in 100 ml 1.1.2.trichloroethane. The stirred mixture was cooled to 0°–5° C. and HCl gas was introduced for 2 hours. An aliquot from the liquid phase was taken and analyzed by N.M.R. (after dilution with $CDCl_3$) and by combined gas-chromatography/mass spectrometry (70° C. for 3 min, then temperature increase 6°/min to 170° C.

The percent conversion of ROH to $R_1CH_2OCH_2Cl$ was calculated from the NMR spectra for the ratios of integration of $R_1CH_2OCH_2Cl$ (5.5 ppm) against $R_1CH_2$—OH (4.3 ppm). Bis-chloromethylmethylether (BCME) $R_T3.44$ min was determined in the $ROCH_2Cl$ in 1.1.2. trichloroethane ($R_T=4.37$ min) detection limit: $1/1.10^8$. The results of these experiments are presented in Table 1, Section A–F.

THE ROLE OF THE FUNCTIONAL HYDROXYL POSITION

Table 1A illustrates the conversion of primary alcohols to the corresponding chloromethylalkylethers. In all cases, the percent BCME is below the detection limit of the instrument. Chloromethyl ether (CME) was also absent. The conversion of secondary alcohols also proceeds to the corresponding chloromethyl alkyl ethers with considerable increase in the concentration of BCME (Table 1B). When the secondary alcohol is also benzylic, a large concentration of BCME is recorded. The same is true for tertiary alcohols (Table 1C)

TABLE 1

$$1 \text{ mole ROH} \xrightarrow[\text{HCl}]{1 \text{ mole } CH_2O} ROCH_2Cl$$

| | No. | Alcohol | Class | % $ROCH_2Cl$ | $\delta ROCH_2Cl$ | % BCME | B.P °C./mm Hg |
|---|---|---|---|---|---|---|---|
| A. | AD-1318 | n-heptyl | Primary | 56 | 5.50 | $<10^{-6}$ | 94–98/20 |
| | AD-1308 | n-decyl | Primary | 52 | 5.54 | $<10^{-6}$ | 143–5/20 |
| | AD-1310 | n-dodecyl | Primary | 100 | 5.50 | $<10^{-6}$ | |
| | AD-1324 | n-tetradecyl (Myristic) | Primary | 35 | 5.49 | $<10^{-6}$ | |
| | AD-1312 | Oleyl | Primary | 50 | 5.50 | $<10^{-4}$ | |
| B. | AD-1302 | 2-octyl | Secondary | 52 | 5.54 | $<0.003$ | 105–106/20 |
| | AD-1306 | cyclohexyl | Secondary | 58 | 5.57 | 0.025 | 116–120/20 |
| | AD-1330 | menthyl | Secondary | 80 | 5.58 | | |
| | AD-1326* | 1-phenylethyl | Secondary/benzylic | | | 4.37 | |
| C. | AD-1304** | 2-(2-methyl)butyl | tertiary | | | 5.11 | |
| D. | AD-1328 | o-nitrophenyl | phenolic | 50 | 5.49 | 0.06 | |
| E. | AD-1332 | pentaerythritol | polyol | 25 | 5.47 | $<10^{-6}$ | |
| | AD-1354 | Glucose | polyol | | 5.50 | 0.07 | |
| F. | | $CH_3$—⟨ ⟩—$SO_2NH$—$CH_2$—$CH_2OH$ | | 100 | 5.50 | $<10^{-6}$ | |
| G. | AD-1336*** | IRA-743 | polyol | 16 | | $<10^{-6}$ | |
| | | XE-305—⟨ ⟩—$SO_2NH$—$CH_2CH_2OH$ | | 80 | | $<10^{-6}$ | |

*(1-phenylethyl)(2'-methyl-2'-phenylethyl) ether is the main product
**2-chloro-2-methylbutane is the main product
***IRA-743 contains covalently bound glucoseamine The conversion of hydroxyaryl compounds, substituted with an electron pulling deactivating group (e.g. nitrophenol, Table 1D) 1 Ed to the corresponding nitroaryl chloro methyl ether. A similar result was obtained with the conversion to N(-2'-hydroxyethyl)-4-toluene sulphonamide (Table 1F). The conversion of polyhydric alcohols as pentaeythritol or glucose also proceeds very readily (Table 1E). Lastly, polymeric alcohols, such as N-(2-hydroxyethyl)-4'-sulphonamido polystyrene or Amberlite IRA-743, incorporating glucose amine units, are also converted readily to polymeric chloromethyl ethers.

In accordance with the above, the preferred alcohols for use in the present invention have the formula:

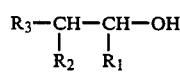

wherein:
a. $R_1$ and $R_2$ are each hydrogen, and $R_3$ is alkyl, branched alkyl or cycloalkyl; or
b. two out of $R_1$, $R_2$ and $R_3$ are hydrogen, and the other is a group Ar-Y, wherein Ar is an aromatic group and Y is nitro, carboxaldehyde, carboxylic acid ester or carboxamine; or
c. $R_1$ and $R_2$ are each a group Ar-Y as defined in (b), and $R_3$ is hydrogen; or
d. $R_1$ and $R_2$ are linked together to form a cycloalkyl group and $R_3$ is straight chain alkyl, branched alkyl or cycloalkyl; or
e. $R_1$ is methyl, and $R_2$ or $R_3$ are an oxyethylene group ($-OCH_2-CH_2-)_n$ where n is an integer from 1 to 15, and the other is hydrogen; or
f. $R_1$, $R_2$ and $R_3$ are hydrogen or alkyl and $R_3$ is a recurring moiety of the formula $(CH=CH)_n$ where n is an integer of from 1 to 10.

CONTROL OVER FORMATION OF BIS-CHLOROMETHYLETHER

The importance of the ratio alcohol-to-$CH_2O$ (Table 2)

In the case of primary alcohols, the ratio of alcohol-to-$CH_2O$ units determines the presence of BCME, a slight excess of ROH is needed to ensure the total absence of BCME. If a small amount of polyhydric alcohol, such as glucose, is added, then no excess of the primary alcohol is needed. Alternatively a solid polymeric polyhydric alcohol, such as IRA-793, may be added, and can be removed after the reaction by simple filtration.

Polymeric halomethylating agents

The polymeric alcohols described in Table 2 may themselves be converted to the halomethyl polymeric ethers and used in the halomethylation of aromatic substrates.

4. a Lewis acid catalyst, i.e. $SnCl_4$.

The sequence of reactions taking place is a follows:
A. Generation of $ROCH_2Cl$.

$$2ROH + TiCl_4 \rightarrow Ti(OR)_2Cl_2 + 2HCl \qquad A\text{-}1$$

$$2ROH + 2HCl + 2CH_2O \rightarrow 2ROCH_2Cl + 2H_2O \qquad A\text{-}2$$

$$Ti(OR)_2Cl_2 + 2H_2O \rightarrow 2ROH + Ti(OH)_4 \qquad A\text{-}3$$

Overall for A:

$$2ROH + TiCl_4 + 2CH_2O \rightarrow 2ROCH_2Cl + Ti(OH)_4$$

Overall for B: Chloromethylation.

$$2ROCH_2Cl + 2ArH + SnCl_4 \xrightarrow{SnCl_4} 2ArCH_2Cl + 2ROH$$

Overall for steps A and B:

$$2ArH + 2CH_2O + TiCl_4 \rightarrow 2ArCH_2Cl + Ti(OH)_4$$

The one-step chloromethylation (or halomethylation when $TiBr_4$, $TiF_4$ or other halides are taken) has the ultimate advantage that the chloromethylating agent (or halmethylating agent) is generated in situ in very small concentration, and reacts immediately with the aromatic acceptor, and does not come into contact with the operator at any stage. Table 3 provides examples of this kind of one-step chloromethylation, on polymeric substrates.

TABLE 3

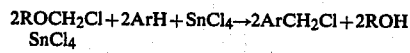

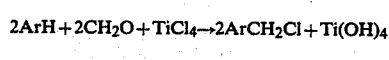

1.2

TABLE 2

Effect of the Ratio ROH/$CH_2O$ (R = 1-octyl)

| No. | ROH:$CH_2O$ | EXTERNAL ALCOHOL | % ROCH$_2$Cl | % BCME in ROCH$_2$Cl | % BCME in TRAP |
|---|---|---|---|---|---|
| AD-929 | 2:3 | — | 100 | 1.07 | |
| AD-1292 | 0.97:1 | — | 100 | 0.37 | $<10^{-6}$ |
| AD-1236 | 1.10:1 | — | 100 | $<10^{-6}$ | $<10^{-6}$ |
| AD-1346 | 0.97:1 | IRA-743 | 100 | $<10^{-6}$ | |
| | 0.97:1 | Glucose | 100 | $<10^{-6}$ | |
| | 0.97:1 | CH$_3$—⌬—SO$_2$NH—CH$_2$CH$_2$OH | 95 | $<10^{-6}$ | |
| | 0.97:1 | P—⌬—SO$_2$NH—CH$_2$CH$_2$OH | 95 | $<10^{-6}$ | |

One-step chloromethylation (in situ generation of chloromethyl alkylethers)

One-step chloromethylation (or halomethylation) can be achieved in a system containing the following components:
1. a transition metal halide as a source for HCl (or HX), e.g. $TiCl_4$, $ZnCl_2$ in equimolar amount.
2. equimolar amount of paraformaldehyde.
3. a catalytic amount of ROH

| POLYMER (1 mmoles) | $(CH_2O)_4$ mmoles | $C_8H_{17}OH$ mmoles | $TiCl_4$ mmoles | D.C.E. ml | % conversion |
|---|---|---|---|---|---|
| Polystyrene (MW. 30,000) | 10 | 0.1 | 1 | 10 | 7 |
| Polystyrene | 6 | 2 | 1.5 | 40 | 13.9 |
| Polystyrene | 6 | 6 | 6 | 40 | 22 |
| Pontibond | 6 | 6 | 6 | 30 | 15.7 |

0.5 mole $SnCl_4$; 20 hours at ambient temperature.
D.C.E. = Dichloroethane

The invention is further illustrated by the following examples:

EXAMPLE 1

Chloromethyloctylether a. 75 g (2.5 mole) of paraformaldehyde were stirred in 250 ml 1,1,2-trichloroethane with 268 ml (2.5 mole) 1-octanol at 0°–5° C. HCl gas was passed for one hour. The product chloromethyloctyl ether can be isolated by evaporation of the excess solvent. Alternatively, a stock solution of 3M concentration is made in 1,1,2-trichloroethane and used as such, or kept refrigerated. Chloromethyloctylether may be distilled, b.p. 63°–64° C. (0.7 torr).

NMR (CDCl$_3$): —O—CH$_2$Cl at 5.5 ppm (2 hydrogens).

Concentration of CME (see example 7)<1 ppm.
Concentration of BCME (see example 7)<2 ppm.

b. 33 g (1.1 mole) of (CH$_2$O)$_n$ were stirred in 100 ml 1,1,2-trichloroethane with 130 g (1.0 mole) 1-octanol at 0°–5° C. HCl gas was passed for one hour. The product was analysed by MS-GC, as described in example 7 and was found to contain 2.3% bis-chloromethylether.

EXAMPLE 2

Bromomethyloctylether 30 g (1 mole) of paraformaldehyde, 107 ml of 1-octanol (1 mole) are stirred in 100 ml chloroform at 0°–5° C., by passing HBr gas. After the reaction completion, indicated by the complete dissolution of the solid, the organic layer is washed with water several times, and dried over anhydrous sodium sulphate. The residue is diluted in chloroform, to give a 3M solution. The product boiled at 150°–155° C. (1 torr) and has a singlet (2 hydrogens) at 5.8 ppm from TMS. The product is kept refrigerated.

EXAMPLE 3

Chloromethylhexylether 30 g (1 mole) of paraformaldehyde were stirred in 100 ml of 1,1,2-trichloroethane with 102 g (1 mole) of 1-hexanol at 0°–5° C. HCl gas was passed for 2 hours. The product is diluted to give a stock solution of 3M concentration.

NMR (CDCl$_3$) 5.5 ppm (OCH$_2$Cl).

The product is kept refrigerated.

EXAMPLE 4

Chloromethyldodecylether 30 g (1 mole) of paraformaldehyde were stirred in 100 ml 1,2-dichloroethane with 186 g (1 mole) of 1-dodecanol, and HCl gas was passed for 3 hours at 0°–5° C. The product was diluted with more solvent to give a 2M concentration.

NMR (CDCl$_3$) 5.45 ppm (OCH$_2$Cl).

EXAMPLE 5

Chloromethylcyclohexylether 30 g (0.1 mole) of paraformaldehyde were stirred in 100 ml 1,1,2-trichloroethane, at 0°–5° C. with 90 g (0.1 mole) of cyclohexanol. HCl gas was passed for 2 hours. The chloromethylcyclohexyl ether was diluted to 0.2M concentration.

NMR (CDCl$_3$) 5.555 ppm (OCH$_2$Cl).

EXAMPLE 6

Chloromethyl (+) Menthylether 3.0 g (0.1 mole) of paraformaldehyde were stirred at 0°–5° C. with 15.6 g (0.1 mole) of (+) Menthol in 1,1,2-trichloroethane and HCl gas was passed for 2 hours. The product was further diluted to 1M concentration.

NMR (CDCl$_3$) 5.5 ppm (O—C$_2$Cl).

EXAMPLE 7

Determination of chloromethylether and bis(chloromethylether) side products

The presence of those undesired toxic side products was determined by high resolution GC-MS using a FINNIGAN AUTOMATED GAS CHROMATOGRAPH/EI-CI SPECTROMETER SYSTEM 4021. The column used was 10% FS-1265 on Chromosorb W.H.P. SS 9 ft by ⅛". Injection temperature: 170° C. detector temp: 220° C., column: 70° C. for 3 minutes, 6°–8° per minute, up to 170° C. for 6 minutes.

ClCH$_2$OCH$_3$ (Fluka, Technical grade)—contains 11.02%

ClCH$_2$OCH$_2$Cl, major products: 1.40 min. and 1.70 min. is *not* the claimed compound. The M.S.-G.C. library shows line m/e=45 (CH$_3$—OCH$_2$)$^+$ is the major line for ClCH$_2$OCH$_3$. This line is completely absent.

ClCH$_2$OCH$_2$Cl (Fluka, G. C. grade pure): retention time: 3.47 min. 1,1,2-trichloroethane: 4.35 min.

Octanol: 15.0 min.

The halomethylation of various styrene divinylbenzene copolymers to varying substitution degrees are described hereinafter.

EXAMPLE 8:

Chloromethylation of Amberlite-XE-305

This polymer, a product of Rohm & Haas, Philadelphia, USA, is a macroporous styrene divinylbenzene copolymer having 4% D.V.B. concentration and consists of 20–50 mesh size beads.

(a) 10 g of the polymer beads were swollen in 70 ml of 3M chloromethyl-octylether in dry chloroform. 2.0 ml stannic chloride were added, and the mixture stood at 28° C. for 2 hours. The polymer was filtered and washed by the following sequence of solvents: dioxan, water, and methanol. The polymer was dried at 50° C. under vacuum for 20 hours to yield 10.96 g. Analysis shows 8.5% chlorine.

(b) 10 g of the polymer were swollen in 70 ml of 3M chloromethyl-octylether, and 6.0 ml stannic chloride added. After 2 hours reaction at 28° C. and the work-up described in example (3a) the product yield was 12.14 g containing 13.1% chlorine.

EXAMPLE 9

Chloromethylation of 2% D.V.B.-styrene copolymer 10 g of 2% divinylbenzene-styrene copolymer, 200–400 mesh size, upplied by Polyscience Inc., USA was swollen in 70 ml 3M chloromethyl-octylether, and 4 ml of stannic chloride added. After 2 hours at 28° C., the polymer was filtered and washed as described in example (8a), to give 11.5 g of product containing 12.1% chlorine.

EXAMPLE 10

Chloromethylation of Pontybond ® polymers

Pontybond ® polymers, a product of Diamond-Shamrock, U.K., are homogeneously sized styrene divinylbenzene beads, suitable as supports for HPLC chromatography, and available in 10–100 micron size range.

(a) 10 g of 2% D.V.B. Pontybond ® polymer of 100 micron bead diameter was swollen in 70 ml 3M chloromethyloctylether, and 4 ml of stannic chloride was added. After 2 hours standing at 28° C. the product was filtered and washed as described in example (8a) to yield 12.77 g of 17.3% chlorine.

(b) 10 g of 6% D.V.B. Pontybond ® polymer of 15 micron bead size was swollen in 70 ml 3M chloromethyloctylether, and 4 ml stannic chloride was added. After standing at 28° C. for 2 hours, the product was filtered and washed as described in example (8a) to yield 11.48 g of 12.5% chlorine.

EXAMPLE 11

Bromomethylation of Amberlite (XE-305)

12.5 g of Amberlite XE-305 was swollen in 150 ml of 3M bromomethyl-octylether, and 7.5 ml of stannic chloride added. After 24 hours at 70° C. the polymer was filtered and washed as described in example (8a) to yield 20.2 g product containing 34.2% bromine.

EXAMPLE 12

Anion exchange resins from halomethylated polystyrene intermediates

The halomethylated polymeric intermediates described in examples 8–11 can be converted by the commonly known methods to anion exchange resins useful in water purification.

The following general procedures were used:

(a) 10 g Polymer was swollen in 50 ml dioxan and reacted with 50 ml 20% trimethylamine in water at 100° C. for 20 hours. The polymer was filtered and washed with water and methanol.

(b) 10 g Polymer was swollen in 50 ml chloroform and reacted with 10 ml triethylamine at 70° C. for 20 hours. The polymer was filtered and washed with chloroform.

Accordingly the following anion exchange resins were prepared;

(c) The polymer described in example (8a) was reacted with trimethylamine according to (12a) to yield quaternary ammonium chloride polymer incorporating 3.0% N, and 7.5% Cl.

(d) The polymer described in example (8b) was reacted with triethylamine according to (12b) to yield quaternary ammonium chloride polymer incorporating 4.5%N and 12.9% Cl.

(e) The bromoethyl polymer described in example (11) was reacted with triethylamine according to example (12b) to yield quaternary ammonium polymer incorporating 6.3%N and 26.3% Bromine.

EXAMPLE 13

Chloromethylation of soluble polystyrene 5.2 g (30 mmole) of polystyrene M.W. 22,000 was dissolved in 50 ml dry $CHCl_3$ and 18.34 g of $ClCH_2OC_8H_{17}$ (103 mmole) were added, followed by 1.0 ml $SnCl_4$ (2.26 g; 8.7 mmoles). The reaction mixture was heated to 40°–44° C. for 7 hours, 100 ml $CHCl_3$ was added, and the solution treated with 20 ml concentrated HCl, and water, dried over $Na_2SO_4$ and the solvent removed. The chloromethylated polystyrene has a 4.50 ppm absorption ($CDCl_3$) in the NMR, of relative intensity, 0.82H, corresponding to 41% of $CH_2Cl$ groups per aromatic unit. Repetition of the same reaction at 52° C. for 1½ hours yields a product with 67% degree of substitution. With longer times, a gel is produced by competing cross-linking reactions.

EXAMPLE 14

Bromomethylation of soluble polystyrene (M.W=30,000)

12.5 g polystyrene (B.A.S.F. M.W=30,000, 120 mmole) were added to a 3M solution of $C_8H_{17}OCH_2Br$ in 1,1,2-trichloroethane (100 ml=30 mmole) and 4. mol $SnCl_4$ was added. After 4 days at 30° C. the product was precipitated with methanol, redissolved in chloroform and again precipitated in $CH_3OH$. The polymer 18.2 g shows the typical 4.40 ppm absorption ($CDCl_3$) broad and analyzes for 29.9% Br (75% of theoretical).

EXAMPLE 15

Bromomethylation of soluble polysulfone 20 g polysulfone [poly (oxy-1,4-phenylenesulfonyl) 1,4-phenylene oxy-1,4-phenylene (1-methylethylidene)-1,4-phenylene] P-3500 natural, a product of Union Carbide, in 175 ml of 3M $C_8H_{17}OCH_2Br$ in 1,1,2-trichloroethane and 4 ml $SnCl_4$ was reacted at 70° C. for 24 hours. Upon addition of 100 ml $CH_3OH$ the product precipitates. The product was redissolved in 100 ml $CHCl_3$ and reprecipitated with $CH_3OH$. After drying, 24 g of bromomethylpolysulfone showing 80% of monobromomethylation NMR ($CDCl_3$): 4,45,443 (1.6H).

EXAMPLE 16

Chloromethylation of toluene 9.2 g (0.1 mole) toluene were reacted at 0°–5° C. with 100 ml 3M $C_8H_{17}OCH_2Cl$ in 1,1,2-trichloroethane in the presence of 1.0 ml $SnCl_4$ for 4 hours. After treatment of the solution with 20 ml HCl and water, the residue was analysed by MS-G.C. (see example 7) and was found to contain a mixture of para and ortho products in the ratio of 2.5:1. The degree of conversion was 92%.

EXAMPLE 17

Bromomethylation of veratrol 0.138 g (1 mmole) of 1,2-dimethoxybenzene (veratrol) were reacted with 0.223 g (1 mmole) of bromomethyl octylether in 5 ml 1,2-dichloroethane in the presence of 0.12 ml (1 mmole) $SnCl_4$ at room temperature for 1 hour. After washing with HCl and water, followed by drying on $Na_2SO_4$ the product was isolated by the evaporation of the solvent. The product (0.275 g) corresponds by mp., NMR and analysis to cyclotriveratrylene (A. J. Lindsey. *J. Chem. Soc.* 1685 (1965) obtained by trimerization of 3-chloromethyl-1,2-dimethoxybenzene.

EXAMPLE 18

Destruction of excess reagent by hydrolysis

When $C_8H_{17}OCH_2Br$ is mixed vigorously with water for 10 minutes a solid of the structure $C_7H_{15}CH_2O-CH_2-OCH_2C_7H_{15}$ (NMR, $CDCl_3$) is obtained. The same product is obtained upon saponification with NaOH in ethanol.

EXAMPLE 19

Destruction of excess reagent by amination 2.23 g (10 mmole) of $C_8H_{17}OCH_2Br$ were reacted with 1.1 g (15 mmole) of diethylamine in 50 ml of 1,2 dichloroethane for 30 minutes at ambient temperature to yield 1.6 g of diethylamine by hydrobromide and 2.65 g semicrystalline liquid, which has the structure of $C_8H_{17}OCH_2N(CH_3)_2$. No trace of $C_8H_{17}OCH_2Br$ was found.

EXAMPLE 20

Destruction of reagent with hexamethylene tetramine (urotropin)

10 ml (20 mmole) of 2M $C_8H_{17}OCH_2Cl$ were reacted with 3.1 g (22 mmole) $C_4H_8N_4$ (hexamethylene tetraamine). The reaction mixture heated spontaneously and a crystalline product (6.7 g) separated out.

The product is scarcely soluble in $H_2O$, $CH_3OH$, $CHCl_3$, or $CH_3SOCH_3$. The solid was washed with chloroform, and the solution was found by NMR to contain only n-octanol, indicating a quantitative destruction of the reagent to yield (N-methyloxyoctyl) hexamethylene chloride.

Analysis: $Cl^-$, Calcd: 3.44 meg/g; found: 3.54 meg/g.

Further hydrolysis of this salt with acid yields n-octanol.

EXAMPLE 21

Destruction of reagent reaction with methanol 10 ml (20 mmole) of 2M $C_8H_{17}OCH_2Cl$ were reacted with 25 ml methanol at ambient temperature for 1 hour. The reaction mixture was analyzed by NMR and showed the presence of an octyloxymethyl ether. The 5.5 ppm absorption typical to the $-OCH_2Cl$ has disappeared completely.

We claim:

1. A process for the halomethylation of aromatic compounds, comprising reacting a halomethylating agent of the formula

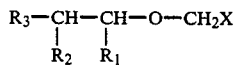

wherein X is selected from the group consisting of chlorine, bromine and iodine, and where:
 a. $R_1$ and $R_2$ are each hydrogen, and $R_3$ is alkyl, branched alkyl or cycloalkyl having 5-10 carbon atoms or;
 b. two out of $R_1$, $R_2$ and $R_3$ are hydrogen, and the other is a group Ar-Y, wherein Ar is an aromatic group and Y is nitro, carboxaldehyde, carboxylic acid ester or carboxamine; or
 c. $R_1$ and $R_2$ are each a group Ar-Y as defined in (b), and $R_3$ is hydrogen; or
 d. $R_1$ and $R_2$ are linked together to form a group having 5-20 carbon atoms and $R_3$ is straight chain alkyl, branched alkyl or cycloalkyl having 5-20 carbon atoms
 e. $R_1$ is methyl, and $R_2$ or $R_3$ are an oxyethylene group $(-OCH_2-CH_2-)_n$ where n is an integer from 1 to 15, and the other is hydrogen; or
 f. $R_1$ and $R_2$ are hydrogen or alkyl having 5-20 carbon atoms and $R_3$ is a recurring moiety of the formula $(CH=CH)_n$ where n is an integer of from 1 to 10, said halomethylating agent being substantially free of bis-halomethyl ether, with an aromatic compound which can be halomethylated with a halomethylating agent such as chloromethylether, in the presence of a Lewis acid catalyst.

2. A process in accordance with claim 1, wherein said halomethylating agent substantially free of bis-halomethyl ether is produced by the process of reacting an alcohol of the formula

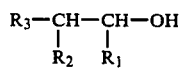

wherein $R_1$, $R_2$ and $R_3$ are as previously defined, with a $CH_2O$-containing compound selected from the group consisting of formaldehyde, trioxan and paraformaldehyde, in an organic solvent, while passing therethrough a hydrogen halide gas, said alcohol being present in an amount at least equimolar to the amount of said $CH_2O$-containing compound.

3. Anion exchange resins, whenever produced by the reaction of an amine with a halomethylaryl polymer prepared according to claim 1, when said aromatic compound is a polymer.

4. A process according to claim 2, further including the step of destroying the excess halomethylating agent by use of urotropin.

5. A process according to claim 1, for the halomethylation of styrene copolymers, wherein said aromatic compound is a styrene copolymer in a suitable swelling agent.

6. A process according to claim 2, for the halomethylation of styrene copolymers, wherein said aromatic compound is a styrene copolymer in a suitable swelling agent.

7. A process according to claim 5, further including the step of destroying the excess halomethylating agent by use of urotropin.

8. Anion exchange resins, whenever produced by the reaction of an amine with a halomethylaryl polymer prepared according to claim 2, when said aromatic compound is a polymer.

9. A process according to claim 1, for the halomethylation of styrene-divinylbenzene copolymers, wherein said aromatic strate compound is a styrene-divinylbenzene copolymer in a suitable swelling agent.

10. A process in accordance with claim 2, wherein said aromatic compound is a macroporous styrene-divinylbenzene copolymer.

11. A process in accordance with claim 2, wherein said aromatic compound is polysulfone.

* * * * *